United States Patent
McCurdy

(10) Patent No.: US 6,302,439 B1
(45) Date of Patent: Oct. 16, 2001

(54) DISTRIBUTED OCCUPANT PROTECTION SYSTEM AND METHOD WITH COOPERATIVE CENTRAL AND DISTRIBUTED PROTECTION MODULE ACTUATION CONTROL

(75) Inventor: Roger A. McCurdy, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/496,304

(22) Filed: Feb. 1, 2000

(51) Int. Cl.[7] .................................................. B60R 21/32
(52) U.S. Cl. .............................................. 280/735; 701/45
(58) Field of Search ................................ 280/735; 701/45

(56) References Cited

U.S. PATENT DOCUMENTS

| | | | |
|---|---|---|---|
| 5,636,864 | | 6/1997 | Hori ...................................... 280/735 |
| 5,653,462 | * | 8/1997 | Breed et al. .......................... 280/735 |
| 5,684,701 | * | 11/1997 | Breed .............................. 364/424.055 |
| 5,718,452 | | 2/1998 | Vogt ...................................... 280/735 |
| 5,825,098 | * | 10/1998 | Darby et al. ......................... 307/10.1 |
| 5,848,802 | * | 12/1998 | Breed et al. .......................... 280/735 |
| 5,865,463 | * | 2/1999 | Gagnon et al. ...................... 280/735 |
| 5,900,677 | * | 5/1999 | Musiol et al. ....................... 307/10.1 |
| 5,904,368 | * | 5/1999 | Blackburn et al. .................. 280/735 |
| 5,906,393 | * | 5/1999 | Mazur et al. ........................ 280/735 |
| 5,964,815 | * | 10/1999 | Wallace et al. ......................... 701/45 |
| 5,988,676 | * | 11/1999 | Lotito et al. ......................... 280/735 |
| 6,018,693 | * | 1/2000 | Blackburn et al. ..................... 701/45 |
| 6,026,340 | * | 2/2000 | Corrado et al. ......................... 701/47 |
| 6,036,225 | * | 3/2000 | Foo et al. ............................. 280/735 |
| 6,099,030 | * | 8/2000 | Kraft .................................... 280/735 |
| 6,212,457 | * | 4/2001 | Michuida et al. ...................... 701/45 |

* cited by examiner

Primary Examiner—Eric Culbreth
Assistant Examiner—L. Lum
(74) Attorney, Agent, or Firm—Tarolli, Sundheim, Covell, Tummino & Szabo L.L.P.

(57) ABSTRACT

A vehicle occupant protection system (10) for a vehicle (12) includes a plurality of occupant protection modules (20–26). Each protection module (e.g., 20) has actuatable components (e.g., 40) for protecting a vehicle occupant. A central control processing module (18) determines whether a vehicle crash condition is occurring and outputs a signal indicative of the crash determination. A sensor module (e.g., 28) senses a condition present at the vehicle and for outputs a signal indicative of the sensed condition. A communication bus (14) is connected to the central control module (18), the sensor module (28), and the plurality of protection modules (20–26), and conveys the crash determination signal and the sensed condition signal to the plurality of protection modules. Each of the plurality of protection modules (e.g., 20) includes an actuation control portion (e.g., 42) for controlling actuation of the actuatable components (e.g., 40) of the respective protection module responsive to the crash determination signal and the sensed condition signal.

18 Claims, 3 Drawing Sheets

DISTRIBUTED OCCUPANT PROTECTION SYSTEM AND METHOD WITH COOPERATIVE CENTRAL AND DISTRIBUTED PROTECTION MODULE ACTUATION CONTROL

TECHNICAL FIELD

The present invention relates to distributed vehicle occupant protection systems.

BACKGROUND OF THE INVENTION

Occupant protection systems for use in vehicles are known in the art. One type of protection system includes an actuatable inflatable restraint module, which has an inflatable restraint that is commonly referred to as an air bag. A controller determines whether the air bag module is to be actuated to inflate the air bag within a vehicle occupant compartment.

The air bag module is actuated by the controller upon the occurrence of a predetermined condition for which a vehicle occupant is to be cushioned by the air bag. For example, a sensor senses a vehicle condition indicative of a vehicle crash condition and, in response thereto, the air bag module is actuated.

Other types of occupant protection devices are utilized within occupant protection systems. Examples of such other occupant protection devices include an inflatable knee bolster, an inflatable side curtain, an inflatable headliner, a seat belt lock, a seat belt pretensioner, and a D-ring adjuster. A person of ordinary skill in the art will appreciate that some or all of such occupant protection devices have adjustable actuation variables. Such adjustable variables include deployment timing, deployment profile, etc. It is to be appreciated that even suppression of actuation of an occupant protection device is an adjustable variable.

Turning to a specific example of an adjustable aspect, in certain circumstances, it may be preferable to refrain from actuating a protection device even if a vehicle crash condition occurs. In one example, if an occupant associated with an air bag module is at a location such that deployment of the air bag will not enhance protection of the occupant, actuation of the air bag module does not occur. One example in which an occupant is located such that deployment of the air bag will not enhance protection of the occupant is when the occupant is very near the air bag module. Typically, an occupant who is very near an air bag module is referred to as being within an occupant out-of-position zone. Actuation of the air bag module for an occupant who is within the occupant out-of-position zone will not enhance protection of the occupant. Another example of an adjustable aspect is to suppress actuation of the protection device (e.g., an air bag module or a pretensioner module) when an occupant is not located on an associated seat.

A protection system that provides for control of a protection device (e.g., an air bag module) in response to sensed condition(s) (e.g., occupant presence, type or location) beyond merely a sensed crash condition is commonly referred to as a "smart" protection system. Control within such smart protection systems is associated with a rather large volume of information processing and decision-making. In other words, a processor algorithm within a smart protection system can be rather complex.

Recently, distributed occupant protection systems have been developed to address the issues of the increasing numbers of protection devices within a vehicle and the increasing numbers of sensory devices used to gather information for the control of the plurality of protection devices. A central control/sensing unit of such a distributed system receives/derives sensory information. The sensory information is processed and determinations regarding protection device control are made. Command signals are output from the central unit over a bus to the plurality of protection devices. Thus, the processing capability of the central unit must be relatively large. Further, as complexity and sophistication of occupant protection systems grow, the ability of the central processing units must correspondingly grow.

SUMMARY OF THE INVENTION

In accordance with one aspect, the present invention provides a vehicle occupant protection system for a vehicle. The system includes a plurality of occupant protection means that each has an actuatable portion for protecting a vehicle occupant. Central processing means determines whether a vehicle crash condition is occurring and outputs a signal indicative of the crash determination. Sensor means senses a condition present at the vehicle and outputs a signal indicative of the sensed condition. Communication interconnection means, connected to the central processing means, the sensor means, and the plurality of protection means, conveys the crash determination signal and the sensed condition signal to the plurality of protection means. Each of the plurality of protection means includes means for controlling actuation of the actuatable portion of the respective protection means responsive to the crash determination and the sensed condition signal.

In accordance with another aspect, the present invention provides a vehicle occupant protection system for a vehicle. The system includes a plurality of occupant protection means that each has an actuatable portion for protecting a vehicle occupant. Central processing means determines whether a vehicle crash condition is occurring and outputs a signal indicative of the crash determination. Sensor means senses a condition indicative of need of protection means actuation and outputs a signal indicative of the sensed condition. Communication interconnection means, connected to the central processing means, the sensor means, and the plurality of protection means, conveys the crash determination signal and the sensed condition signal to the plurality of protection means. Each of the plurality of protection means includes means for controlling actuation of the actuatable portion of the respective protection means responsive to the crash determination signal and the sensed condition signal.

In accordance with another aspect, the present invention provides a method of protecting a vehicle occupant. A determination is made at a central processing location as to whether a vehicle crash condition is occurring. A signal indicative of the crash determination is output. The crash determination signal is conveyed via communication interconnection means from the central processing location to a plurality of vehicle occupant protection means. A condition that is present at the vehicle is sensed at a sensor location. A signal indicative of the sensed condition is output. The sensed condition signal is conveyed via the communication interconnection means from the sensor location to the plurality of protection means. Actuation of an actuatable portion of each respective protection means is controlled at the respective protection means responsive to the crash determination signal and the sensed condition signal.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
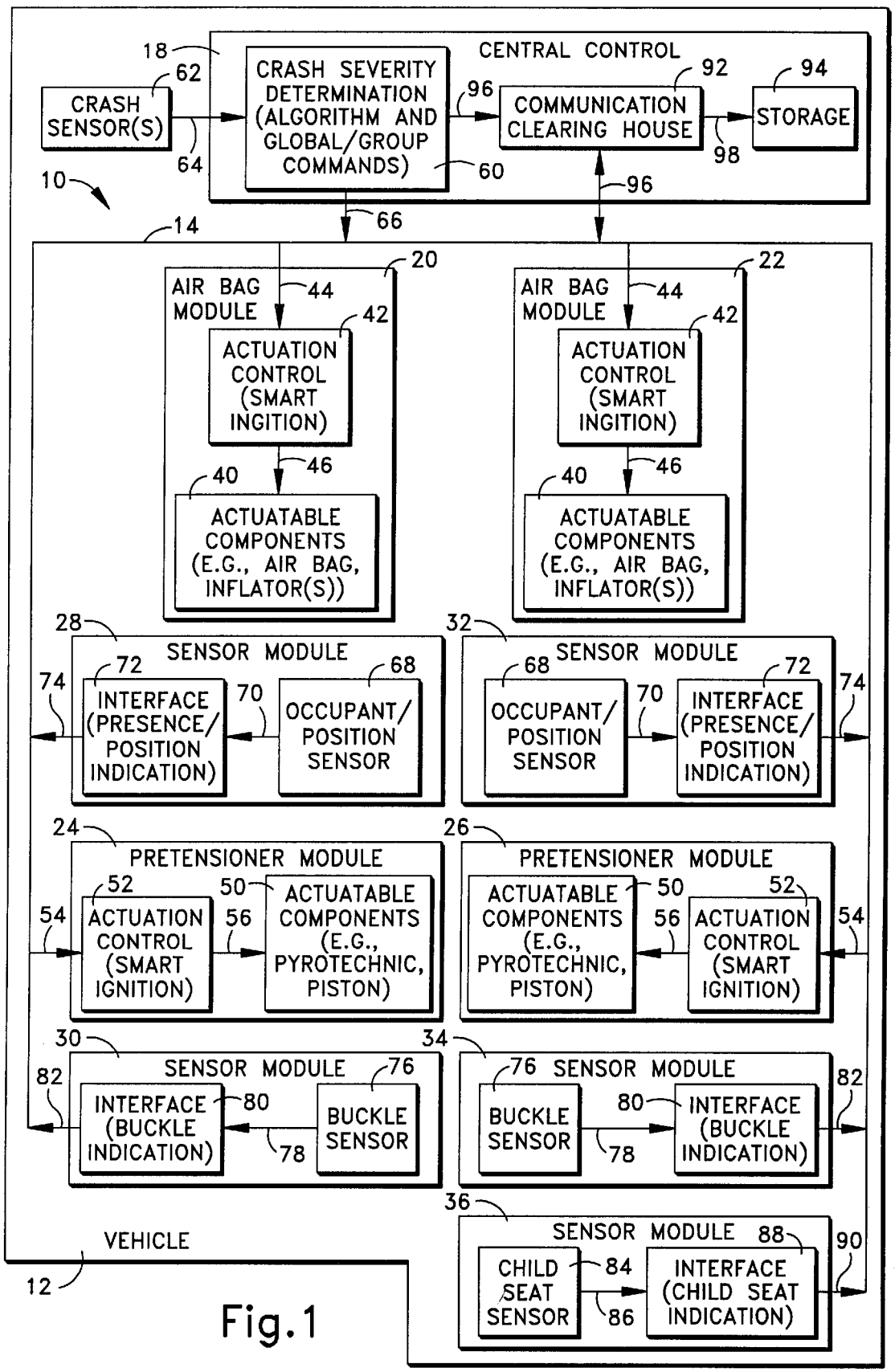
FIG. 1 is a schematic illustration of an occupant protection system in accordance with the present invention and within a schematically illustrated vehicle.

An occupant protection system 10 in accordance with the present invention and an associated vehicle 12 are schematically illustrated in FIG. 1. The occupant protection system 10 is provided to enhance protection of one or more occupants (not shown) who are located within the vehicle 12.

The protection system 10 is a distributed system, in that at least some of the components of the protection system are located remote from other components of the protection system. A communication bus 14 of the protection system 10 interconnects the components of the system. The communication bus 14 includes at least one electrical conductor, such as a metal wire, along which electrical energy can flow to convey communication messages. The components of the protection system 10 that are interconnected via the communication bus 14 include a central control processing module 18, a plurality of actuatable protection modules 20–26, and a plurality of sensor modules 28–36.

For the purpose of illustration and not for the purpose of limitation, the protection modules include first and second air bag modules 20 and 22, respectively, and first and second seat belt pretensioner modules 24 and 26, respectively. The first air bag module 20 and the first pretensioner module 24 are associated with a first vehicle seat (e.g., a driver seat) or a first occupant location, and the second air bag module 22 and the second pretensioner module 26 are associated with a second vehicle seat (e.g., a front passenger seat) or second occupant location. It is to be appreciated that other/different actuatable protection modules may be included within the protection system 10.

Turning to the air bag modules 20 and 22, each air bag module (e.g., 20) includes components 40 that are actuatable to provide the protection function of the air bag module. Also, each air bag module (e.g., 20) includes an actuation control portion 42 that is operatively connected 44 to the communication bus 14 and operatively connected 46 to the actuatable components 40. Each actuation control portion 42 processes information provided to the respective air bag module (e.g., 20) via signals from the communication bus 14 and provides control signal(s) to the actuatable components 40.

In the illustrated example, each of the actuatable components 40 includes a two-stage air bag device that includes an inflatable cushion restraint. The inflatable restraint is commonly referred to as an air bag, and is stored in a folded condition within the module in a manner well known in the art. One or more sources of inflation fluid (e.g., nitrogen gas) are provided within the actuatable components 40 to inflate the associated air bag. The source(s) of inflation fluid are commonly referred to as inflator(s).

Each inflator includes a stored quantity of pressurized inflation fluid and/or an inflation fluid generating material. The inflator(s) are electronically activated by the actuation control portion 42 to initiate flow of inflation fluid into the air bag. The flow of inflation fluid inflates the air bag within an occupant compartment of the vehicle, as will be appreciated by a person of ordinary skill in the art.

Each pretensioner module (e.g., 24) includes actuatable components 50, such as a pyrotechnic material and a piston/cylinder arrangement. The actuatable components 50 are operatively connected between an anchor point (not shown) and a seat belt webbing (not shown). Upon ignition of the pyrotechnic material, the piston/cylinder arrangement of the actuatable components 50 operate to remove slack from the seat belt webbing that extends across an occupant.

An actuation control portion 52 of the pretensioner module 24 is operatively connected 54 to the communication bus 14 and is operatively connected 56 to the actuatable components 50. The actuation control portion 52 controls ignition of the pyrotechnic material of the actuatable components 50. Specifically, each actuation control portion 52 processes information provided to the respective pretensioner module (e.g., 24) via signals from the communication bus 14 and provides control signal(s) to the actuatable components 50.

The protection modules 20–26 within the system 10 can be actuated upon the occurrence of a vehicle crash condition. The central control module 18 includes a portion 60 for making one or more determinations regarding the occurrence of a vehicle crash condition. In particular, the determination portion 60 makes determinations regarding severity and/or type of the vehicle crash. In the illustrated example, the determinations are specifically directed to crash severity and the determination portion 60 is accordingly referred to as the crash severity determination portion. In one embodiment, the crash severity determination portion 60 makes determinations, and outputs signals accordingly, as to whether the crash severity is at a first, second, or third level of severity.

One or more crash sensors 62 are operatively connected 64 to the crash severity determination portion 60 of the central control module 18. In one example, the crash sensor(s) 62 include an accelerometer for sensing sudden vehicle deceleration. Vehicle rollover and crush sensors are still further examples of crash sensors that provide sensory information for making crash condition determinations.

The crash sensor(s) 62 provide signal(s) that are utilized by the crash severity determination portion 60 to make the crash determinations. The crash severity determination portion 60 performs one or more algorithms to process the information provided by the crash sensor(s) 62. The product of the performance of the one or more algorithms is one or more command signal(s) that are request(s) to actuate one or more protection modules 20–26 that are within the system 10. The crash severity determination portion 60 is operatively connected 66 to the communication bus 14, and the command signal(s) are provided onto the communication bus for reception by the protection modules 20–26.

In the disclosed embodiment, each actuation command signal indicates that a crash is occurring, identifies the severity level/type of vehicle crash, and requests that all of the protection modules (e.g., 20–26) actuate accordingly. The actuation commands are referred to as global commands.

As an addition/modification to the disclosed embodiment, the crash severity determination portion also selects/determines which of the protection modules 20–26 are to be requested to actuate. The selection/determination is dependent upon the severity/type of the vehicle crash. It is to be appreciated that, under certain conditions such as certain crash severity/types, it is not desirable to request actuation of all of the protection modules 20–26. Accordingly, at least one of the actuation commands is a command to actuate less than all (e.g., a group) of the protection modules (e.g., 24 and 26).

For example, the actuation command request may only request actuation of the pretensioner modules 24 and 26 and not the air bag modules 20 and 22 when occupants are secured by seat belts and a low-level crash occurs. Such an actuation command is accordingly referred to as a group command for reception by the protection modules 20–26. Each group command includes an address or other identifying means such that each protection module (e.g., 20) is notified as to whether a received command is directed to that particular protection module. Here in after, the actuation commands are referred to as global/group commands.

In accordance with the present invention, the provision of a global/group command onto the communication bus 14 per se does not result in actuation of the commanded protection module(s) (e.g., 24 and 26). The actual determination of whether to actuate a protection module is made within the actuation control portion (e.g., 52) of that specific protection module. The global/group command is merely a signal indicating a completed determination a vehicle crash condition is occurring and a completed determination regarding possible protection module actuation. The global/group command is processed at the respective actuation control portion (e.g., 42) in conjunction with other sensory input to make a determination regarding actuation of that particular protection module (e.g., 20).

The sensory input for processing within the protection modules 20–26 is provided by the plurality of sensor modules 28–36 that are operatively connected to the communication bus 14. The person of ordinary skill in the art will appreciate that various types of sensor modules can be employed to provide sensory information that can be used within the actuation control portion (e.g., 42) of a protection module (e.g., 20) to make a determination regarding actuation of that protection module.

In the illustrated example, the sensor modules 28–36 include first and second occupant/position sensor modules 28 and 32, respectively, first and second buckle sensor modules 30 and 34, respectively, and a child seat sensor module 36. The first occupant/position sensor module 28 and the first buckle sensor module 30 are associated with the first vehicle seat (e.g., the driver seat). The second occupant/position sensor module 32, the second buckle sensor module 34, and the child seat sensor module 36 are associated with the second vehicle seat (e.g., the front passenger seat). Thus, it is to be understood that the first occupant/position sensor module 28 and the first buckle sensor module 30 are associated with the first air bag module 20 and the first pretensioner module 24. The second occupant/position sensor module 32, the second buckle sensor module 34, and the child seat sensor module 36 are associated with the second air bag module 22 and the second pretensioner module 26. The person of ordinary skill in the art will appreciate that other/different sensor modules can be provided within the system 10 and accordingly associated.

Turning to the occupant/position sensor modules 28 and 32, each module includes a sensor 68 that senses the presence and/or the position of an occupant on the associated seat. Various types of occupant/position sensor modules are known, such as ultrasonic, infrared, and capacitance-type, and are usable within the system 10.

The occupant/position sensor 68 is operatively connected 70 to an interface portion 72 of the occupant/position sensor module (e.g., 28) that is, in turn, operatively connected 74 to the communication bus 14. The occupant/position sensor 68 provides sensory information via signal to the interface portion 72. The interface portion 72 processes the raw sensory signal and conveys the sensory information onto the bus in the form of messages.

Each buckle sensor module (e.g., 30) includes a buckle sensor 76 that is operatively connected 78 to an interface portion 80 of the buckle sensor module. The interface portion 80 is operatively connected 82 to the communication bus 14. The buckle status (i.e., buckled or unbuckled) of the seat belt (not shown) for the associated seat is sensed by the buckle sensor 76 and a signal indicative thereof is provided to the interface portion 80. One example of a buckle sensor is merely a switch device that closes when the tongue of a seat belt buckle is inserted into a clasp of the seat belt system. The interface portion 80 processes the raw sensor signal and provides a data signal that conveys the buckle status onto the communication bus 14.

The child seat sensor module 36 includes a child seat sensor 84 that is operatively connected 86 to an interface portion 88. The child seat sensor module 36 may be any known type of child seat sensor such as a tag detection sensor. The interface portion 88 processes a raw indication signal from the child seat sensor 84. The interface portion 88 is operatively connected 90 to the communication bus 14 and provides a data signal onto the bus indicative of a presence or absence of a child seat on associated vehicle seat.

It is to be appreciated that arrowheads in FIG. 1 show the flow of signals/data for operation of the system to provide for protection of vehicle occupants (i.e., control of the protection modules). In particular, it is to be noted that data flow does not occur from the sensor modules 28–36 on the communication bus 14 to the crash severity determination portion 60. Instead, the data flow on the communication bus 14 is to the protection modules 20–26 both from the crash severity determination portion 60 and the sensor modules 28–36.

Thus, it is to be appreciated that the central control module 18, and specifically the crash severity determination portion 60 of the central control module, is not burdened by the processing of information from the plurality of sensor modules 28–36 that are operatively connected to the communication bus 14. Each of the protection modules (e.g., 20) connected to the communication bus 14 receives sensory information, and sensory information that is pertinent to the control of that protection module is processed to make determinations regarding actuation control of that respective protection module. Thus, the central control module 18 merely sends a crash occurrence (e.g., crash severity)/actuation request onto the communication bus 14 for reception by the protection modules 20–26, and the protection modules utilize sensory information placed onto the communication bus by the plurality of sensor modules 28–36 to make final determinations. In other words, each protection modules (e.g., 20) makes a determination as to whether its actuation will enhance protection of an occupant. Another way of viewing this arrangement is, because the central control module 18 provides global/group commands, the sensory information that is provided onto the communication bus 14 and processed by the protection modules 20–26 can be used to modify the global/group commands from the central control module.

It is to be appreciated that the central control module 18 can perform tasks other than the crash determinations and the associated provision of the global/group (crash indicative/actuation) commands. Preferably, such other tasks do not conflict with the architecture of the central control module 18 providing the global/group commands and the protection modules making final determinations regarding actuation based upon provided sensory information. As examples of other tasks that are performed by the central control module 18, the central control module includes a communication clearinghouse portion 92 and a storage portion 94.

The communication clearinghouse portion 92 is operatively connected 96 to the communication bus 14 and the crash severity determination portion 60. The communication clearinghouse portion 92 controls the flow of information signals and monitors the content of the information signals that pass on the communication bus 14. The storage portion 94 is operatively connected 98 to the communication clearinghouse portion 92 and receives data for storage. The stored data is retrievable. In particular, the stored data is retrievable after a crash such that the data may be analyzed. Also, the data can be used in a diagnostic function (not shown) within the central control module 18.

Figure 2:
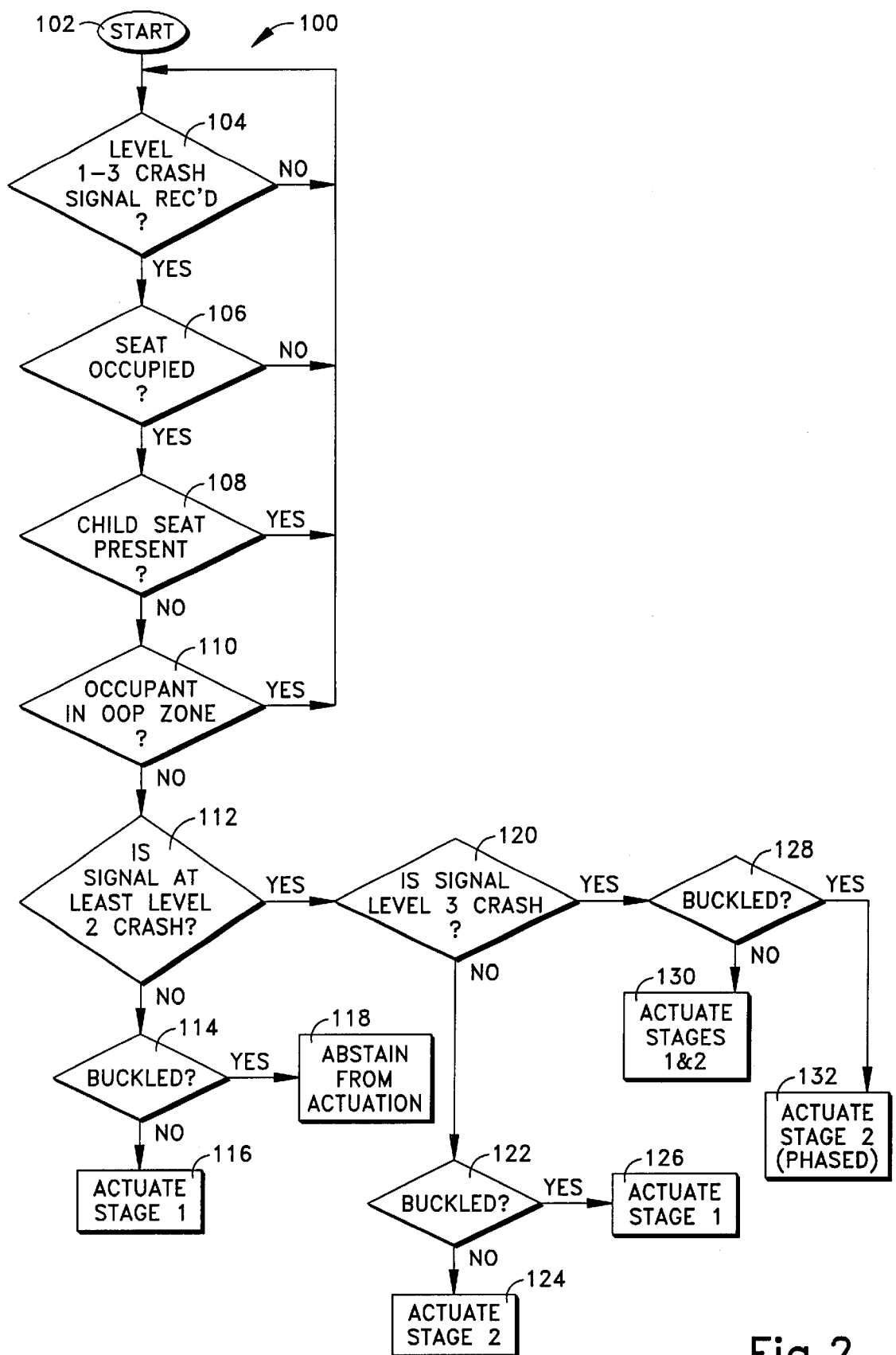
FIG. 2 is a flow chart for a process performed within an air bag module shown within FIG. 1.

Turning to FIG. 2, an example of a process 100 performed within the actuation control portion 42 of the second air bag module 22 is shown. It is to be appreciated that the process 100 is associated with the second seat (e.g., the front passenger seat). A similar, yet different, process is performed within the actuation control portion 42 of the first air bag module 20.

The process 100 is initiated at step 102 and proceeds to step 104. At step 104, it is determined whether the second air bag module 22 has received a signal via the communication bus 14 from the crash severity determination portion 60 indicating a crash condition. In other words, at step 104, it is determined whether a crash signal is received indicating a crash of severity level one, two or three. If the determination at step 104 is negative (i.e., a crash indicating signal is not yet received), the process 100 loops to again repeat the query of step 104. However, if the determination at step 104 is affirmative (i.e., a crash indicating signal of level one, two or three is received), the process 100 proceeds from step 104 to step 106.

At step 106, it is determined whether the associated seat (i.e., the passenger seat) is occupied. The actuation control portion 42 makes the determination at step 106 based upon sensory information provided by the second occupant/position sensor module 32, the second buckle sensor module 34, and/or the child seat sensor module 36. If the determination at step 106 is negative (i.e., the seat is not occupied), the process 100 loops back to step 104. It should be noted that if the seat is not occupied, there is no need to actuate protection modules 22 and 26 that are associated with that seat because to do so would be merely wasteful and costly.

If the determination at step 106 is affirmative (i.e., the seat is occupied), the process 100 goes from step 106 to step 108. At step 108, it is determined whether a child seat is present upon the associated seat. The determination as to whether a child seat is present is based upon sensory information provided by the child seat sensor module 36. Of course, other sensory information can be utilized. If the determination at step 108 is affirmative (i.e., a child seat is determined to be present), the process 100 loops from step 108 to step 104. It is to be appreciated that if a child seat is present, actuation of the second air bag module 22 will not enhance protection of a child located within such a child seat. If the determination at step 108 is negative (i.e., a child seat is determined not to be present on the associated seat), then the process 100 goes from step 108 to step 110.

At step 110, it is determined whether the occupant present on the seat is located within an occupant out-of-position (OOP) zone. The determination at step 110 is made by the actuation control portion 42 based upon sensory information provided by the second occupant/position sensor module 32. If the determination at step 110 is affirmative (i.e., the occupant is within the OOP zone), then the process 100 loops from step 110 to step 104. It is to be appreciated that actuation of the actuatable components 40 of the second air bag module 22 for an occupant who is located within the OOP zone will not enhance protection of the occupant.

The person of ordinary skill in the art will appreciate that looping to step 104 from either of steps 106–110 results in abstention from actuation of the actuatable components 40 of the second air bag module 22. In other words, the process 100 never reaches any of the later steps (e.g., 112–132) where actuation can occur.

If the determination at step 110 is negative (i.e., the occupant is not within the OOP zone), the process 100 goes from step 110 to step 112. At step 112, it is determined whether the crash severity signal provided by the crash severity determination portion 60 of the central control module 18 indicates a level two or level three severity (i.e., at least a level two crash). If the determination at step 112 is negative, the received signal indicates a level one crash. Upon the negative determination at step 112 (i.e., a level one crash signal receive), the process 100 goes from step 112 to step 114.

At step 114, it is determined whether the seat belt associated with the seat is buckled. The determination regarding the buckled status is made within the actuation control portion 42 based upon information provided by the second buckle sensor module 34. If the determination at step 114 is negative (i.e., the seat belt is not buckled), the process 100 goes from step 114 to step 116. At step 116, actuation of the first stage of the actuatable components 40 of the second air bag module 22 occurs (e.g., only a first one of the two inflators provides immediate inflation of the air bag). The actuation of the first stage provides a first level of cushioning or restraining force to enhance protection of the occupant seated upon the associated seat.

If the determination at step 114 is affirmative (i.e., the seat belt is buckled), the process 100 goes from step 114 to step 118. At step 118, the air bag module abstains from actuating. Abstention from actuation is appropriate because the buckled seat belt enhances the protection of the occupant and actuation of the air bag module will not provide an appreciable increase in the protection of the occupant due to the relatively low level of severity of the crash (i.e., a level one crash). Thus, the cost associated with replacement of the actuated air bag module is avoided.

Turning again to step 112, if the determination at step 112 is affirmative (i.e., a crash severity that is either level two or level three), the process 100 goes from step 112 to step 120. At step 120, it is determined whether the signal provided by the crash severity determination portion 60 of the central control module 18 indicates a level three crash. If the determination at step 120 is negative (i.e., the crash signal from the central control module 18 indicates a level two crash), the process 100 goes from step 120 to step 122.

At step 122, it is determined whether the seat belt is buckled. If the determination at step 122 is negative (i.e., the seat belt is not buckled), the process 100 goes from step 122 to step 124. At step 124, the actuatable components 40 of the air bag module 22 are actuated in a stage two actuation. At the bare minimum, a stage two actuation is different from a stage one actuation, and provides a different level of protection enhancement of the occupant. In one example, a stage two actuation involves a second one of the two inflators providing for immediate inflation of the air bag. Because the occupant is not buckled, the air bag module enhances the protection of the occupant.

If the determination at step 122 is affirmative (i.e., the seat belt is buckled), the process 100 proceeds from step 122 to step 126. At step 126, stage one of the air bag module is actuated. At step 126, only the stage one of the air bag is actuated because the air bag module will act in concert with the buckled seat belt to enhance protection of the occupant.

Turning again to step 120, if the determination at step 120 is affirmative (i.e., the signal provided by the crash severity determination portion 60 of the central control module 18 indicates a level three crash), the process 100 goes from step 120 to step 128. At step 128, it is determined whether the seat belt is buckled. If the determination at step 128 is negative (i.e., the seat belt is not buckled), the process 100 goes from step 128 to step 130.

At step 130, the air bag module is actuated with both stages one and two providing inflation fluid to the air bag. Actuation of stages one and two of the air bag enhances the protection provided by the system because of the severity of the crash and the unbuckled status of the occupant.

If the determination at step 128 is affirmative (i.e., the seat belt is buckled), the process 100 goes from step 128 to step 132. At step 132, the air bag module actuates stage two. Preferably, the actuation of stage two of the air bag is a phased actuation. Stage two is actuated (e.g., phase) rather than actuation of stages one and two because the air bag acts in concert with the secured seat belt to enhance the protection of the occupant.

Figure 3:
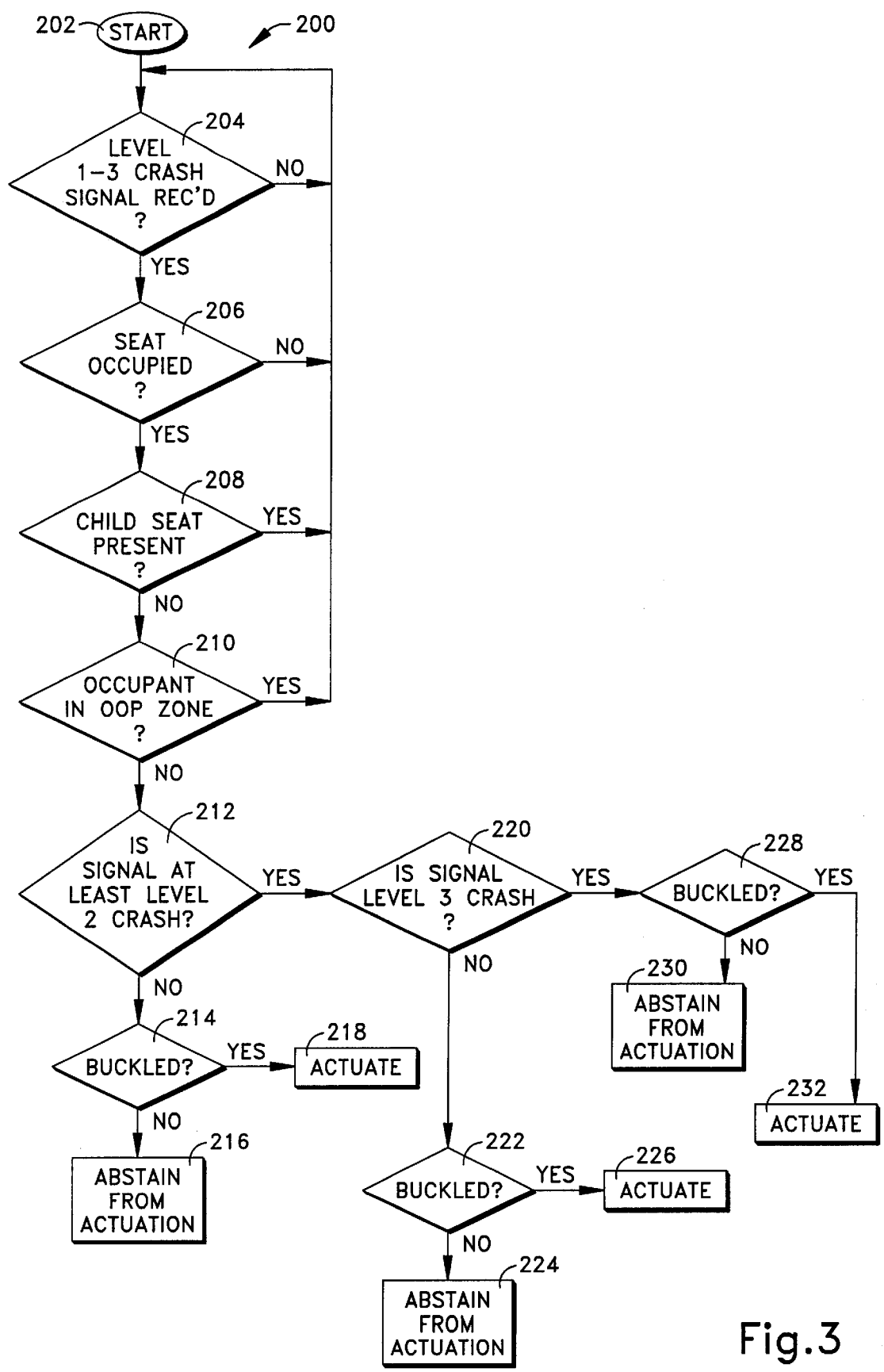
FIG. 3 is a flow chart for a process performed within a pretensioner module shown in FIG. 1.

Turning to FIG. 3, a flowchart for a process 200 performed within the actuation control portion 52 of the second pretensioner module 26 is shown. It is to be appreciated that the process 200 is associated with the second seat (e.g., the front passenger seat). A similar, yet different, process is performed within the actuation control portion 52 of the first pretensioner module 24.

The process 200 contains steps 202–210 that are essentially identical to steps 102–110 of the process 100 of FIG. 2. Thus, for brevity, steps 202–210 (FIG. 3) are not discussed in detail but will be understood by a person of ordinary skill in the art.

Turning to step 212, it is determined whether the crash severity signal provided by the crash severity determination portion 60 of the central control module 18 indicates a level two or level three severity (i.e., at least a level two crash). If the determination at step 212 is negative, the received signal indicates a level one crash. Upon the negative determination at step 212 (i.e., a level one crash signal receive), the process 200 goes from step 212 to step 214.

At step 214, it is determined whether the seat belt associated with the seat is buckled. The determination regarding the buckled status is made within the actuation control portion 42 based upon information provided by the second buckle sensor module 34. If the determination at step 214 is negative (i.e., the seat belt is not buckled), the process 200 goes from step 214 to step 216. At step 216, the pretensioner module 26 abstains from actuating. Abstention from actuation is appropriate because the unbuckled seat belt can not enhance the protection of the occupant and actuation of the pretensioner is merely wasteful. Thus, the cost associated with replacement of the actuated pretensioner is avoided. Protection of the occupant is provided by the actuation (stage one actuation) of the second air bag module 22.

If the determination at step 214 is affirmative (i.e., the seat belt is buckled), the process 200 goes from step 214 to step 218. At step 218, actuation of the actuatable components 50 of the second pretensioner 26 occurs. The actuation enhances protection of the occupant seated upon the associated seat by removing lack from the buckled seat belt. It should be note that the system abstains from actuation of the second air bag module 22 because of the protection provided by the tensioned set belt and the relatively low crash severity (i.e., a level one crash). Thus, the cost associated with replacement of the second air bag module 22 is avoided.

Turning again to step 212, if the determination at step 212 is affirmative (i.e., a crash severity that is either level two or level three), the process 200 goes from step 212 to step 220. At step 220, it is determined whether the signal provided by the crash severity determination portion 60 of the central control module 18 indicates a level three crash. If the determination at step 220 is negative (i.e., the crash signal from the central control module 18 indicates a level two crash), the process 200 goes from step 220 to step 222.

At step 222, it is determined whether the seat belt is buckled. If the determination at step 222 is negative (i.e., the seat belt is not buckled), the process 200 goes from step 222 to step 224. At step 224, the pretensioner module 26 abstains from actuating. Abstention from actuation is appropriate because the unbuckled seat belt can not enhance the protection of the occupant and actuation of the pretensioner is merely wasteful. Thus, the cost associated with replacement of the actuated pretensioner is avoided. Protection of the occupant is provided by the actuation (stage two actuation) of the second air bag module 22.

If the determination at step 222 is affirmative (i.e., the seat belt is buckled), the process 200 proceeds from step 222 to step 226. At step 226, the second pretensioner module 26 is actuated. The tensioned seat belt will act in concert with the actuated (stage one) second air bag module 22 to enhance protection of the occupant.

Turning again to step 220, if the determination at step 220 is affirmative (i.e., the signal provided by the crash severity determination portion 60 of the central control module 18 indicates a level three crash), the process 200 goes from step 220 to step 228. At step 228, it is determined whether the seat belt is buckled. If the determination at step 228 is negative (i.e., the seat belt is not buckled), the process 200 goes from step 228 to step 230.

At step 230, the second pretensioner module 26 abstains from actuating. Abstention from actuation is appropriate because the unbuckled seat belt can not enhance the protection of the occupant and actuation of the pretensioner is merely wasteful. Thus, the cost associated with replacement of the actuated pretensioner is avoided. Protection of the occupant is provided by the actuation (stages one and two actuation) of the second air bag module 22.

If the determination at step 228 is affirmative (i.e., the seat belt is buckled), the process 200 goes from step 228 to step 232. At step 232, the second pretensioner module 26 is actuated. The tensioned seat belt will act in concert with the actuated (stage one and two, phased) second air bag module 22 to enhance protection of the occupant.

From the above description of the invention, those skilled in the art will perceive improvements, changes and modifications. For example, although the illustrated example is directed to control of actuation of the protection modules, it is to be appreciated that the control can apply to adjustable aspects of the protection modules. Specifically, at each protection module, the signal indicating the determination regarding crash occurrence is processed in conjunction within sensory signal(s) to make determinations as how the protection module is to deploy (e.g., the deployment profile, etc.). Such improvements, changes and modifications within the skill of the art are intended to be covered by the appended claims.

Having described the invention, the following is claimed:

1. A vehicle occupant protection system for a vehicle, said system comprising:

a plurality of occupant protection means, each having an actuatable portion for protecting a vehicle occupant;

central processing means for determining whether a vehicle crash condition is occurring and for outputting a signal indicative of the crash determination;

sensor means for sensing a condition present at the vehicle and for outputting a signal indicative of the sensed condition; and communication interconnection means, connected to said central processing means, said sensor means, and said plurality of protection means, for conveying the crash determination signal and the sensed condition signal to said plurality of protection means;

wherein each of said plurality of protection means includes means for controlling actuation of said actuatable portion of said respective protection means responsive to the crash determination signal and the sensed condition signal.

2. A system as set forth in claim 1, wherein said sensor means includes means for sensing occupant presence.

3. A system as set forth in claim 1, wherein said sensor means includes means for sensing occupant position.

4. A system as set forth in claim 1, wherein said sensor means includes means for sensing seat belt use.

5. A system as set forth in claim 1, wherein said central processing means includes means for outputting a signal indicating a request to actuate a group of the protection means.

6. A system as set forth in claim 5, wherein each of said means for controlling includes means for making a determination to proceed with the request to actuate using the sensed condition signal.

7. A system as set forth in claim 1, wherein the sensed condition signal is processed only at said means for controlling at a respective protection means for the purpose of determining whether a respective actuatable portion should be actuated.

8. A system as set forth in claim 1, wherein the crash determination signal conveys information about crash severity.

9. A system as set forth in claim 8, wherein said means for controlling of each of said plurality of protection means independently determines an extent of actuation of the respective actuatable portion based upon the crash determination signal, as indicative of crash severity, and the sensed condition signal.

10. A vehicle occupant protection system for a vehicle, said system comprising:

a plurality of occupant protection means, each having an actuatable portion for protecting a vehicle occupant;

central processing means for determining whether a vehicle crash condition is occurring and for outputting a signal indicative of the crash determination;

sensor means for sensing a condition indicative of need of protection means actuation and for outputting a signal indicative of the sensed condition; and communication interconnection means, connected to said central processing means, said sensor means, and said plurality of protection means, for conveying the crash determination signal and the sensed condition signal to said plurality of protection means;

wherein each of said plurality of protection means includes means for controlling actuation of said actuatable portion of said respective protection means responsive to the crash determination signal and the sensed condition signal.

11. A system as set forth in claim 10, wherein said sensor means includes means for sensing occupant presence.

12. A system as set forth in claim 10, wherein said sensor means includes means for sensing seat belt use.

13. A method of protecting a vehicle occupant, said method comprising:

determining, at a central processing location, whether a vehicle crash condition is occurring;

outputting a signal indicative of the crash determination;

conveying the crash determination signal via communication interconnection means from the central processing location to a plurality of vehicle occupant protection means;

sensing, at a sensor location, a condition present at the vehicle;

outputting a signal indicative of the sensed condition;

conveying these sensed condition signal via the communication interconnection means from the sensor location to the plurality of protection means; and controlling actuation of an actuatable portion at each of the respective protection means responsive to the crash determination signal and the sensed condition signal.

14. A method as set forth in claim 13, wherein said step of sensing a condition includes sensing occupant presence.

15. A method as set forth in claim 13, wherein said step of sensing a condition includes sensing occupant position.

16. A method as set forth in claim 13, wherein said step of sensing a condition includes sensing seat belt use.

17. A method as set forth in claim 13, wherein said steps of determining whether a vehicle crash condition is occurring, outputting a signal indicative of the crash determination, and conveying the crash determination signal includes determining a group of protection means to request to actuate, outputting a signal indicating the request to actuate the group of the protection means, and conveying the group request signal.

18. A method as set forth in claim 17, wherein said step of controlling actuation of an actuatable portion at each of the respective protection means includes determining to proceed with the request to actuate using the sensed condition signal.

* * * * *